July 1, 1952 — J. J. KAUFMANN — 2,601,872
LOOM HARNESS
Filed Aug. 31, 1949 — 3 Sheets-Sheet 1
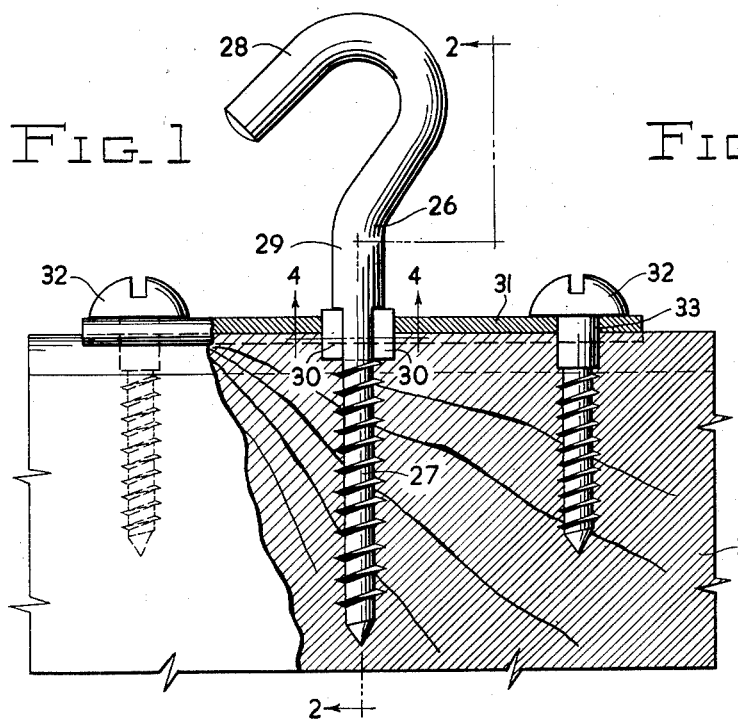
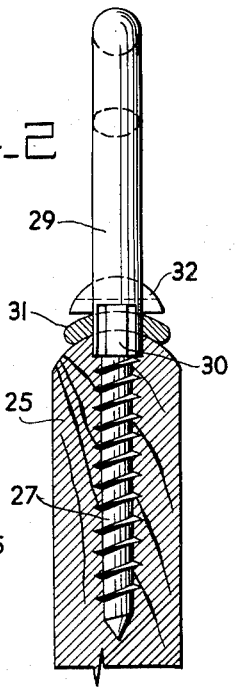
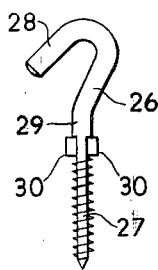
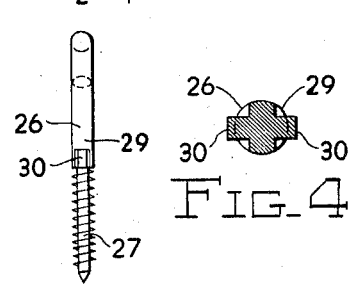
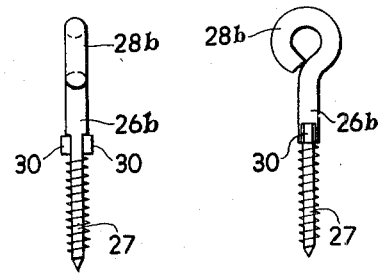
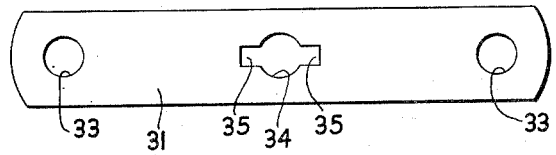
INVENTOR.
JOHN J. KAUFMANN
BY Jas. C. Wolensmith
ATTORNEY

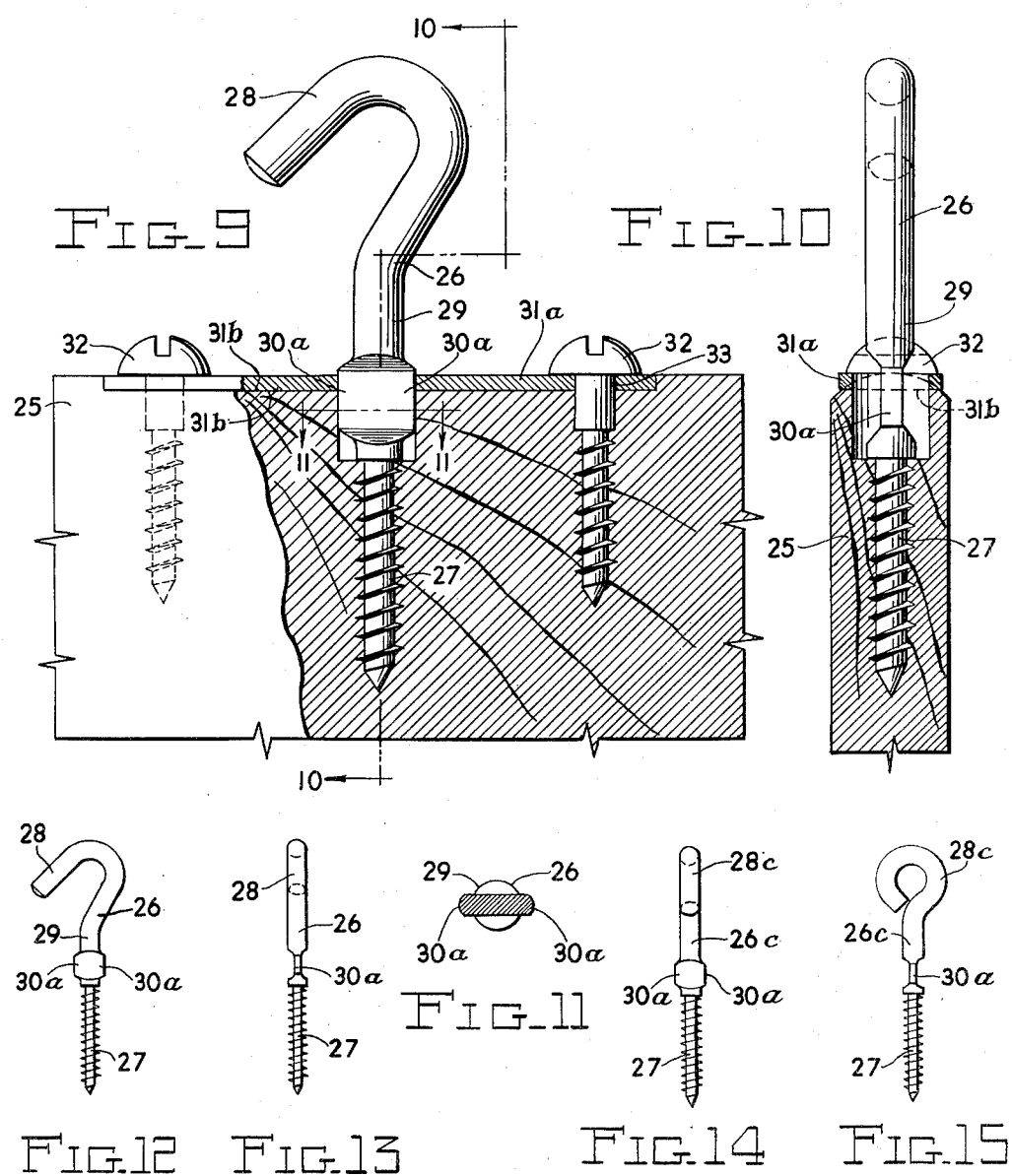

July 1, 1952 — J. J. KAUFMANN — 2,601,872
LOOM HARNESS
Filed Aug. 31, 1949 — 3 Sheets-Sheet 3
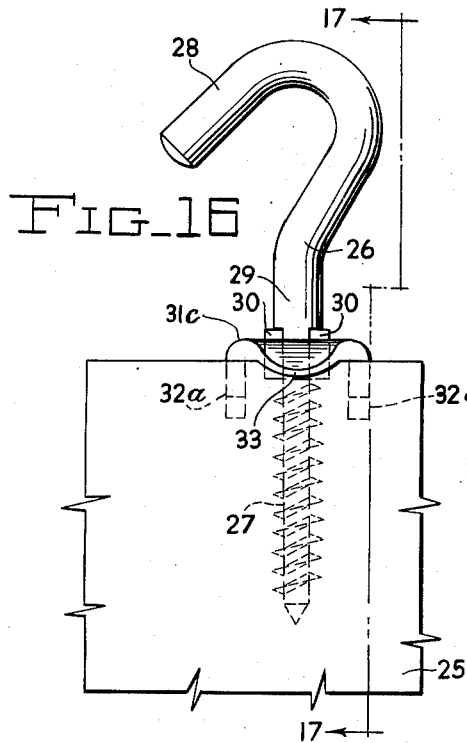
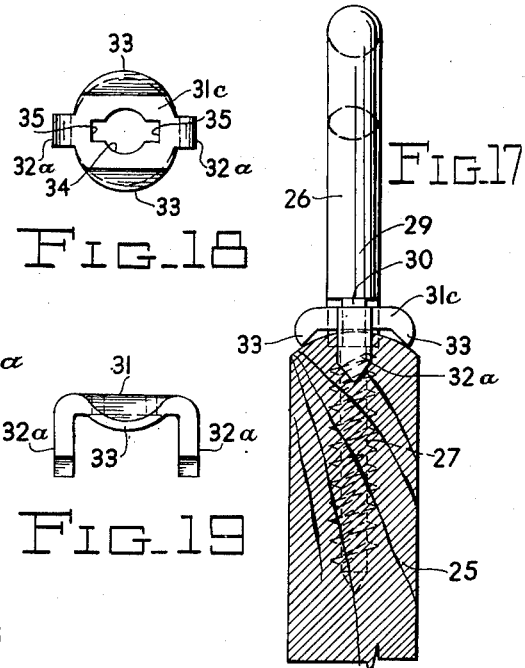
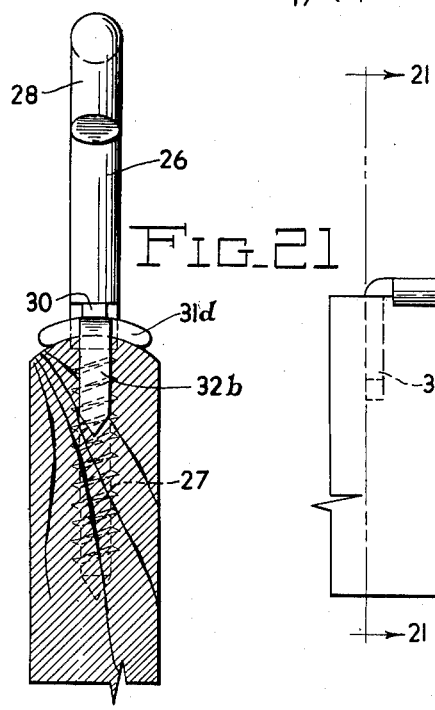
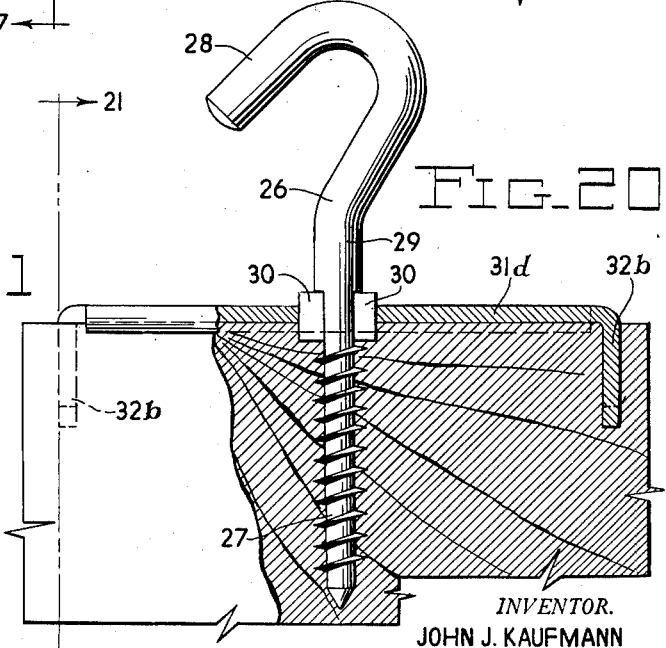
INVENTOR.
JOHN J. KAUFMANN
BY Jas. C. Wobensmith
ATTORNEY Patented July 1, 1952

2,601,872

UNITED STATES PATENT OFFICE 2,601,872

LOOM HARNESS

John J. Kaufmann, Elkins Park, Pa., assignor to Steel Heddle Manufacturing Company, Philadelphia, Pa., a corporation of Pennsylvania Application August 31, 1949, Serial No. 113,430

5 Claims. (Cl. 139—88)

This invention relates to loom harness, and it relates more particularly to improved means for securing the screw hooks, and screw eyes, as well as the other "hardware" used in loom harness frames, in such manner as to prevent the same from turning improperly to incorrect positions and thus causing smashes and other damage to the loom parts, as well as to the fabric being woven.

The present invention is applicable not only to the screw hooks and screw eyes which are used for connecting the jack-cords and actuating straps to the frames, but also in some instances, may be employed for the prevention of the improper turning of the so-called "hooks" which are used in loom hardness frames for supporting the heddle rods intermediate the ends thereof, although ordinarily such "hook" devices will be maintained against turning to dangerous positions by the engagement thereof with the heddle rods.

However, such screw hooks and screw eyes, as well as the other devices used in loom harness to which the invention is applicable may be embraced in the claims under the generic term "connecting devices," and such term should be understood to include not only the screw hooks and screw eyes which are used for attaching the jack-cords and actuating straps to the frames, but also to the so-called "hooks" or brackets which are used for supporting the heddle rods intermediate the ends thereof.

The principal object of the present invention is to provide relatively inexpensive means for securing the screw hooks, and screw eyes, and other "hardware" used in loom harness frames, which will effectively prevent said devices from turning, whereby portions of the same, or the parts coacting therewith, will project beyond the planes of the sides of the top and bottom rails or shafts of the frame.

A further object of the invention is to provide means, of the character aforesaid, which will be positive and certain in its action.

A further object of the invention is to provide means, of the character aforesaid, which will be relatively inexpensive, not only in the cost of the device, but also in the mounting thereof on the harness frame.

A further object of the invention is to provide means, of the character aforesaid, which will permit the ready removal and replacement of the aforesaid actuator connectors without requiring the dismantling of the frame or the removal of the frame from the loom, and also without requiring special tools, equipment or skill.

The nature and characteristic features of the invention will be more readily understood from the following description, taken in connection with the accompanying drawings forming part hereof, in which:

Figure 1 is a view partly in elevation and partly in section, on an enlarged scale, of a portion of a rail or shaft of a loom harness frame having a screw hook mounted therein, and illustrating means embodying the main features of the present invention applied thereto;

Fig. 2 is a transverse section taken on the line 2—2 of Fig. 1;

Fig. 3 is a top or plan view of a locking plate shown in Fig. 1, detached;

Fig. 4 is a transverse section of the screw hook shown in Fig. 1, said section being taken on the line 4—4 of Fig. 1;

Figs. 5 and 6 are respectively front and side elevations of a screw hook, detached, and illustrated on a more nearly natural scale;

Figs. 7 and 8 are similar views of a screw eye employed in lieu of the screw hook in those instances where the jack cords or the actuating straps are provided with hooks for engaging such screw eyes;

Figs. 9 and 10 are views similar to Figs. 1 and 2, but illustrating a modified form of the invention;

Fig. 11 is a transverse section of a portion of one of the screw hooks shown in Figs. 9 and 10;

Figs. 12, 13, 14 and 15 are views similar to Figs. 5, 6, 7 and 8, but illustrating the screw hooks and eyes of the form shown in Figs. 9 and 10;

Figs. 16 and 17 are views similar to Figs. 1 and 2, but illustrating a modified form of locking device;

Fig. 18 is a top or plan view of the locking device shown in Figs. 16 and 17;

Fig. 19 is a side elevation thereof; and

Figs. 20 and 21 are views similar to Figs. 1 and 2, but illustrating another modified form of locking device.

It should, of course, be understood that the description and drawings herein are illustrative merely, and that various modifications and changes may be made in the structure disclosed without departing from the spirit of the invention.

Referring now more particularly to the form of the invention shown in Figs. 1 to 8 of the drawing, 25 is a portion of one of the top rails or shafts of a loom harness frame, the same usually being made of wood, and 26 is a hook member mounted therein.

A portion of the shank portion of the hook member 26 is threaded as at 27 for mounting the same in the rail or shaft 25 it, of course, being understood that a hole is preliminarily drilled in the rail at the place where the hook 26 is to be located. When the rail or shaft is made of wood the threads on the shank portion of the hook member 26 are of the wood screw type.

The hook portion 28 of the hook member 26 is of the usual shape or configuration for the purpose of attaching thereto one of the jack cords or actuating straps used for raising and lowering the harness frames of the looms to effect the shedding of the warp.

The shank portion of the hook member 26 between the threaded portion 27 and the unthreaded portion 29 thereof is provided with a pair of sidewise extending lugs 30, which are formed by displacing side portions of the metal of the shank outwardly by means of suitable pressing tools or punches, thereby deforming the circular cross-section of the shank portion 29 of the hook member 26 to provide the lugs 30 on opposite sides thereof, as shown more particularly in Figs. 1 and 4 of the drawings.

Mounted on the marginal edge of the rail or shaft 25 is a locking member 31 which, as shown in Figs. 1 and 2 of the drawings, may consist of a metal strip or plate held in place by means of wood screws 32, the shanks of which pass through apertures 33 in said member. The member 31, in transverse section, may be bent as shown in Fig. 2 to conform to the shape of the edge portion of the rail or shaft 25.

The locking member 31 is also provided with a central aperture 34, the central portion of which is circular and of a diameter to conform to the shank portion 29 of the hook member 26, and two recesses 35 are provided at the sides of the aperture 34 in which the lugs 30 of the hook member 26 are positioned to lock the hook member 26 against undesired rotation.

It will be noted that the hook member 26 may be mounted in the rail of the frame and brought to the proper position therein with the hook portion 28 thereof lying in the central plane of a harness frame, with the plate member loose and spaced away from the edge of the rail or shaft 25 until the hook member is brought to its proper position.

The plate member may then be brought to its operative location on the edge of the rail or shaft 25, and secured in such position by means of the wood screws 32. When thus mounted and secured the plate member 31 will serve effectively to lock the hook member 26 against turning on the axis of its shank which would permit portions of the hook member 26 to extend beyond the planes of the side faces of the rail 25 and result in damage to adjacent frames, and would also be likely to cause smashes of the harness, as well as damage to the cloth being woven.

In the form of the invention shown in Figs. 9 to 15, inclusive, the parts are quite similar to those shown in Figs. 1 to 8, inclusive. In this form the side lugs 30ª on the shank of the hook member 26 are formed by squeezing the metal, of which the hook member is formed, entirely across on both sides, as illustrated more particularly in Figs. 9 to 11, inclusive, of the drawings.

Also, in this form, the locking plate 31ª is made flat in transverse section and is seated in a recess 31ᵇ cut in the top edge of the rail.

In the form of the invention shown in Figs. 16 to 19, inclusive, the locking member 31ᶜ is made much shorter than in the preceding forms, and is provided at oppositely disposed locations with prongs 32ª which are driven into the rail 25. In this form of the invention, the locking member is also provided on each side downwardly extending lugs 33 which engage the edge portion of the rail 25 so as to assist in restraining the hook member from turning in the rail, notwithstanding the shorter leverage afforded by the securing prongs 32ª.

In the form of the invention shown in Figs. 20 and 21 of the drawings, the hook member 26 is substantially the same as in the preceding forms, and the locking member 31ᵈ is made similar to that shown in Figs. 1 and 2 of the drawings, with the exception that said locking member is provided at its ends with prongs 32ᵇ which are driven into the rail as shown in Figs. 20 and 21.

It will be noted that in all the various forms of the invention shown in the drawings, the cord or strap connection member such as a screw hook or eye is provided on its shank with sidewise projecting lugs which are engaged by a locking member, which may be preliminarily slid over the threaded shank of the attaching member after said attaching member is brought to the desired position, the locking member may then be secured to the rail as illustrated in the drawings.

I claim:

1. In loom harness, the means for securing connecting devices to the top and bottom rails of the harness frames which comprises the provision, on each of such devices, of a shank having a threaded portion positioned within the rail, a portion positioned adjacent the edge of the rail shaped in cross-section to provide sidewise extending lugs, and a portion of circular cross-section located beyond said lug portion, and a locking member mounted on the edge portion of the rail, said locking member having an aperture through which the shank of the device extends, said aperture being shaped to provide a central circular part and having recesses at the sides complemental to the sidewise extending lugs carried by the shank of the connector device, and means for detachably securing the locking member to the rail.

2. In loom harness, the means for securing connecting devices to the top and bottom rails of the harness frames which comprises the provision, on each of such devices, of a shank having a threaded portion positioned within the rail, a portion positioned adjacent the edge of the rail shaped in cross-section to provide sidewise extending lugs, and a portion of circular cross-section located beyond said lug portion, and a locking member mounted on the edge portion of the rail, said locking member having an aperture the central portion of which is of circular conformation with recesses on opposite sides thereof and through which aperture the shank of the device extends, the lugs on said shank engaging the recesses at the sides of the aforesaid aperture, and means for detachably securing the locking member to the rail.

3. In loom harness, the means for securing connecting devices to the top and bottom rails of the harness frames which comprises the provision, on each of such devices, of a shank having a portion positioned within the rail, a portion positioned adjacent the edge of the rail shaped in cross-section to provide sidewise extending lugs, and a portion of circular cross-section located beyond said lug portion, and a locking member mounted on the edge portion of the rail, said locking member having an aperture through which the shank of the device extends, and said aperture being shaped to provide a central circular part with recesses at the sides complemental to the sidewise extending lugs carried by the shank of the connecting device.

4. In loom harness, the means for securing connecting devices to the top and bottom rails of the harness frames which comprises the provision, on each of such devices, of a shank having a threaded portion positioned within the rail, a portion positioned adjacent the edge of the rail shaped in cross-section to provide sidewise extending lugs, and a portion of circular cross-section located beyond said lug portion, and a locking member mounted on the edge portion of the rail, said locking member having an aperture through which the shank of the device extends, said aperture being shaped to provide a central circular part with recesses at the sides complemental to the sidewise extending lugs carried by the shank of the connecting device, and means for detachably securing the locking member to the rail comprising wood screws extending through apertures in said locking member.

5. In loom harness, the means for securing connecting devices to the top and bottom rails of the harness frames which comprises the provision, on each of such devices, of a shank having a threaded portion positioned within the rail, a portion positioned adjacent the edge of the rail shaped in cross-section to provide sidewise extending lugs, and a portion of circular cross-section located beyond said lug portion, and a locking member mounted on the edge portion of the rail, said locking member having an aperture through which the shank of the device extends, said aperture being shaped to provide a central circular part with recesses at the sides complemental to the sidewise extending lugs carried by the shank of the connecting device, and means for detachably securing the locking member to the rail comprising integral prongs driven into the rail.

JOHN J. KAUFMANN.

REFERENCES CITED

The following references are of record in the file of this patent:

UNITED STATES PATENTS

| Number | Name | Date |
|---|---|---|
| 164,777 | Sladdin | June 22, 1875 |
| 777,223 | Roeh | Dec. 13, 1904 |
| 961,463 | Robidoux | June 14, 1910 |
| 1,261,130 | Jasper | Apr. 2, 1918 |
| 1,497,882 | Rumely | June 17, 1924 |
| 1,545,182 | Beck | July 7, 1925 |
| 1,828,058 | Maynard | Oct. 20, 1931 |
| 1,875,664 | Schlage | Sept. 6, 1932 |
| 1,982,076 | Spahn | Nov. 27, 1934 |
| 2,250,753 | Dieckmann | July 29, 1941 |
| 2,270,813 | Olson | Jan. 20, 1942 |
| 2,380,124 | Streuli | July 10, 1945 |
| 2,380,240 | Hufferd | July 10, 1945 |